United States Patent
Monier et al.

(10) Patent No.: US 10,716,057 B1
(45) Date of Patent: Jul. 14, 2020

(54) POWER-EFFICIENT PASSIVE DISCOVERY BY NETWORK DEVICES

(71) Applicant: Itron, Inc., Liberty Lake, WA (US)

(72) Inventors: Fabrice Monier, Bry sur Marne (FR); Thomas Uhling, Spokane Valley, WA (US); Imad Jamil, Meudon (FR); Keith Barnes, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 0 days.

(21) Appl. No.: 16/555,821

(22) Filed: Aug. 29, 2019

(51) Int. Cl.
*H04W 48/16* (2009.01)
*H04W 52/02* (2009.01)

(52) U.S. Cl.
CPC ....... *H04W 48/16* (2013.01); *H04W 52/0261* (2013.01)

(58) Field of Classification Search
CPC . H04W 48/16; H04W 52/0261; H04W 56/00; H04W 40/24
See application file for complete search history.

(56) References Cited

U.S. PATENT DOCUMENTS

| 2013/0094536 A1* | 4/2013 | Hui | H04B 1/713 375/133 |
| 2019/0320407 A1* | 10/2019 | Goyal | H04W 8/005 |

* cited by examiner

*Primary Examiner* — Keith Ferguson
(74) *Attorney, Agent, or Firm* — Lee & Hayes, P.C.

(57) ABSTRACT

Disclosed are techniques to minimize the electricity consumption of battery powered devices during network discovery and other phases of network operation. Example techniques include efficiently listening for other mains powered and battery powered devices within communication range of the battery powered device by, for example, shortening its listening window depending on how close the time reference maintained by the battery powered device is estimated to be to the time reference used by the other mains powered and battery powered devices within communication range. Other techniques include slowing the rate of listening by the battery powered device when the battery powered device is unlikely to be able to receive discovery messages or is already connected to the network. Other techniques include using knowledge of the network to listen for discovery messages on a channel or channels on which other devices are likely to be transmitting.

20 Claims, 15 Drawing Sheets

POWER-EFFICIENT PASSIVE DISCOVERY BY NETWORK DEVICES

BACKGROUND

Utility meters such as electric, water and gas meters have evolved from isolated devices that simply measure utility consumption and display a consumption reading to so called "smart meters" that are connected devices capable of reporting resource consumption readings automatically over a utility communication network. Some meters, such as electric meters, are powered by electricity service ("mains power") from the electricity grid. Other devices, such as many water and gas meters, are battery powered. In many cases, such battery powered devices are expected to operate for extended periods of time (e.g., twenty years or more) without the batteries being recharged or replaced.

The capabilities of smart meters are continuously growing. Many of the added capabilities of smart meters come with increased power demands on the meter. However, battery technologies have not kept pace with the increased power demands. For this reason, battery powered smart meters have not always been able to adopt many of the new capabilities that have been possible for mains powered devices because doing so would shorten their battery life. Consequently, battery powered smart meters have generally had more limited functionality than their mains powered counterparts, and they have been unable to join certain types of communication networks. Other battery powered devices have faced similar challenges of increasing functionality and communication ability without sacrificing battery life.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

As discussed above, battery powered smart meters and other battery powered devices have been limited in their ability to provide desired functionality and connectivity without sacrificing battery life. This disclosure describes techniques to minimize the electricity consumption of battery powered or other devices during network communications and performance of other functions. For instance, in one example, the disclosure describes techniques for efficiently passively discovering other mains powered and battery powered devices within communication range of a battery powered device, by better adjusting its time references to a time reference used by the devices that may be attempting to communicate with the battery-powered device. In another example, the disclosure describes a technique for a battery powered device to adjust its rate of listening for messages from other mains powered and battery powered devices within communication range of the battery powered device. In another example, the disclosure describes a technique for a battery powered device to better determine on what channels other mains powered and battery powered devices within communication range of the battery powered device may be communicating. These and other techniques described herein allow battery powered devices to perform functions and communicate in ways that were not previously possible.

Many of the examples described in the disclosure are given in the context of an advanced metering infrastructure (AMI) of a utility communication network. However, the techniques described herein are not limited to use in a utility industry AMI. Rather, unless specifically described to the contrary, the techniques described herein applicable to any other communications network, control network, and/or other type of network or system, that includes battery powered network communication devices. By way of example and not limitation, network communication devices include utility meters (e.g., electricity, water, or gas meters), relays, repeaters, routers, transformers, sensors, switches, encoder/receiver/transmitters (ERTs), appliances, televisions, gaming systems, personal computers (e.g., desktop computers, laptop computers, etc.), mobile devices (smartphones, tablets, etc.), smart home devices (e.g., virtual assistant devices, security systems, doorbells, smoke alarms, etc.), servers, access points, or the like. Battery powered network communication devices (or "battery powered devices") are network communication devices that rely on a battery for power (i.e., are not connected to mains power).

Example Environment

Figure 1:
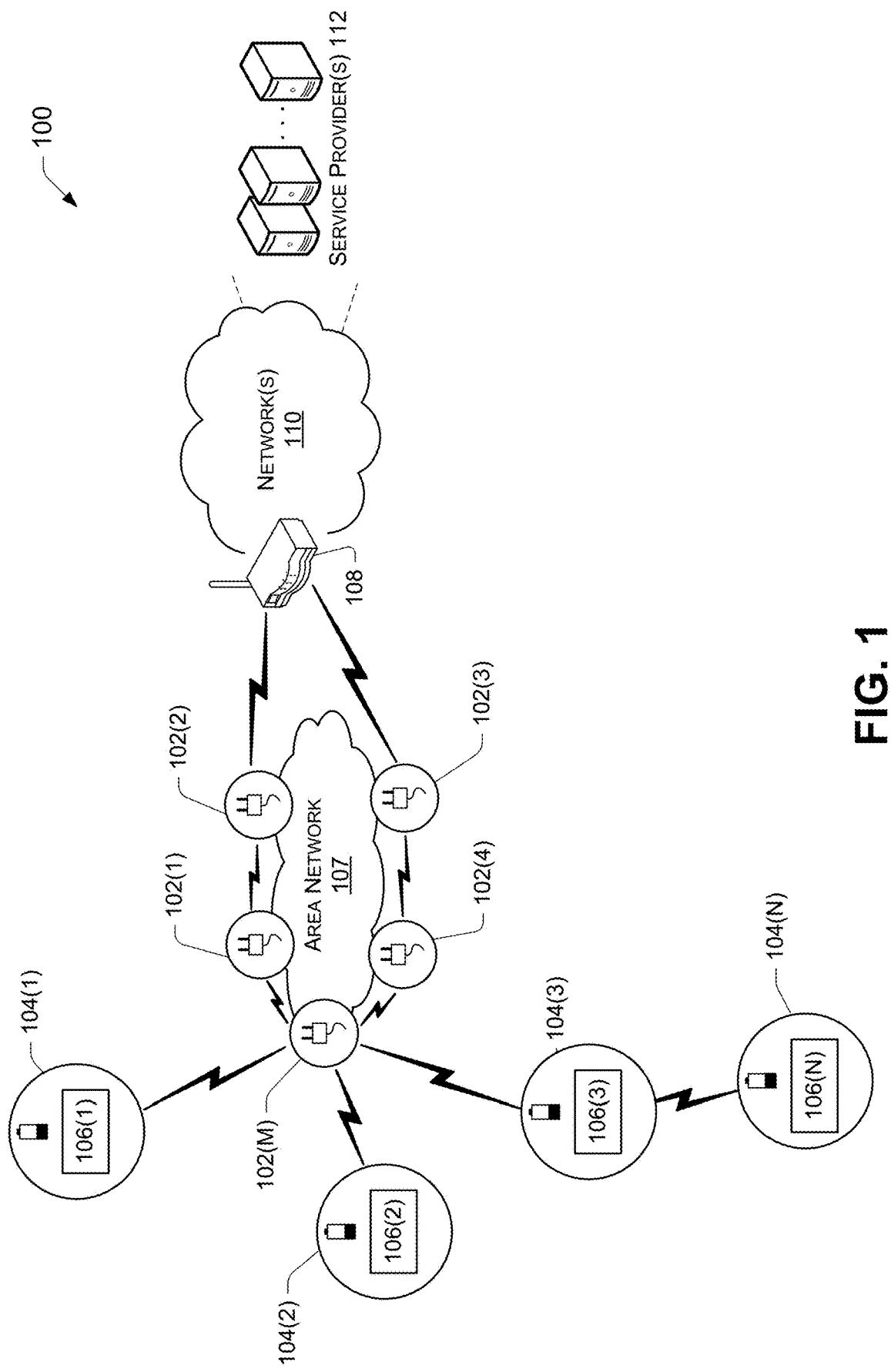
FIG. 1 is a schematic diagram of an example network architecture, including mains powered devices (MPDs) and battery powered devices (BPDs).

FIG. 1 is a diagram illustrating an example networked environment or architecture 100. The architecture 100 includes multiple network communication devices. The network communication devices include mains powered devices 102(1), 102(2), 102(3), 102(4), . . . 102(M) (collectively referred to as "mains powered devices 102" or "MPDs 102"), and battery powered devices 104(1), 104(2), . . . 104(N) (collectively referred to as "battery powered devices 104" or "BPDs 104"), where M and N are any integers greater than or equal to 1 and may be the same number or different numbers. Each BPD 104 listens for passive discovery beacons from other devices according to a listening schedule 106. In the illustrated example, the mains powered devices (MPDs) are representative of electricity meters, while the battery powered devices (BPDs) are representative of water meters and/or gas meters. However, as noted above, in other examples, the MPDs and BPDs may comprise other types of mains powered and battery powered devices, respectively.

The network communication devices are in communication with one another via an area network (AN) 107. As used herein, the term "area network" refers to a defined group of devices that are in communication with one another via one or more wired or wireless links. Examples of area networks include, for example, local area networks (LANs), neighborhood area networks (NANs), personal area networks (PANs), home area networks (HANs), or the like. While only one AN 107 is shown in FIG. 1, in practice, multiple ANs may exist and may collectively define a larger network, such as an advanced metering infrastructure (AMI) of a utility communication network. At any given time, each individual device may be a member of a particular AN. Over time, however, devices may migrate from one AN to another geographically proximate or overlapping AN based on a variety of factors, such as respective loads on the ANs, battery reserves, interference, or the like.

The term "link" refers to a direct communication path between two devices (without passing through or being relayed by another device). A link may be over a wired or wireless communication path, including a wired path over which communication may occur according to a power line communication (PLC) protocol. Each link may represent a plurality of channels over which a device is able to transmit or receive data. Each of the plurality of channels may be defined by a frequency range which is the same or different for each of the plurality of channels. In some instances, the plurality of channels comprises radio frequency (RF) channels. The plurality of channels may comprise a control channel and multiple data channels. In some instances, the control channel is utilized for communicating one or more messages between devices to specify one of the data channels to be utilized to transfer data. Generally, transmissions on the control channel are shorter relative to transmissions on the data channels. An area network may implement a channel hopping sequence, such that the control channel and data channels change over time.

In the illustrated example, the area network 107 comprises a mesh network, in which the network communication devices relay data through the network. Most of the examples given in this disclosure are given in terms of mesh networks. However, at least some of the techniques described herein are also applicable to other types of networks (e.g., star or hub-and-spoke networks, mobile networks, cellular networks, etc.). Additionally, in some instances, one or more devices may be able to communicate with multiple different types of networks (e.g., a mesh network and a star network) at the same or different times. For instance, as described later, if a device is unable to discover a suitable parent in a mesh network mode, the device may attempt to connect to a nearby star network, mobile data collection network, or cellular network. Regardless of the topology of the AN 107, individual network communication devices may communicate by wireless (e.g., radio frequency) and/or wired (e.g., power line communication, Ethernet, serial, etc.) connections.

The network communication devices also include an edge device 108, which serves as a connection point of the AN 107 to one or more backhaul networks 110, such as the Internet. The edge device 108 may include, but is not limited to, a field area router (FAR), a cellular relay, a cellular router, an edge router, a DODAG (Destination Oriented Directed Acyclic Graph) root, a root device or node of the AN 107, a combination of the foregoing, or the like. In this illustrated example, the edge device 108 comprises a FAR, which relays communions from the AN to one or more Service Provider(s) 112 via the network(s) 110. The Service Provider(s) 112 include, for example, a security service such as an Authentication, Authorization and Accounting (AAA) server, a network registration service such as a Dynamic Host Configuration Protocol (DHCP) server, a network management service (NMS), and/or a collection engine (CE). In various examples, network communication devices may register or interact with some or all of these Service Provider(s) 112.

In other examples, the Service Provider(s) 112 may include additional or alternative systems such as a meter data management system (in the utility context), a customer relationship management system (in the sales context), a diagnostic system (in a manufacturing context), an inventory system (in a warehouse context), a patient record system (in the healthcare context), a billing system, etc.

The Service Provider(s) 112 may be physically located in a single central location, or they may be distributed at multiple different locations. The Service Provider(s) 112 may be hosted privately by an entity administering all or part of the communications network (e.g., a utility company, a governmental body, distributor, a retailer, manufacturer, etc.), or may be hosted in a cloud environment, or a combination of privately hosted and cloud hosted services.

Referring back to FIG. 1, two ways in which BPDs can connect to area network (AN) 107 include (1) via connection directly with a mains powered device (MPD) or (2) via a battery powered device that acts as a relay (a BPD relay). Referring back to FIG. 1, in the first scenario, a battery powered water meter, BPD 104(1), discovers in its vicinity an electricity meter, MPD 102(M), connected to mains power. Because MPD 102(M) is connected to mains power, it has no practical energy constraints. BDP 104(1) may associate MPD 102(M) as its parent, in which case MPD 102(M) acts as the connecting point between BPD 104(1) and the Service Provider(s) 112. In the second scenario, a gas meter, BPD 104(N), discovers a battery powered water meter, BPD 104(3), which is already connected to the AN 107 via MPD 102(M) and can play the role of a BPD relay. BPD 104(N) may associate this BPD-relay, BPD 104(3), as its parent to get connected to the AN 107.

Example Network Communications Devices

Figure 2:
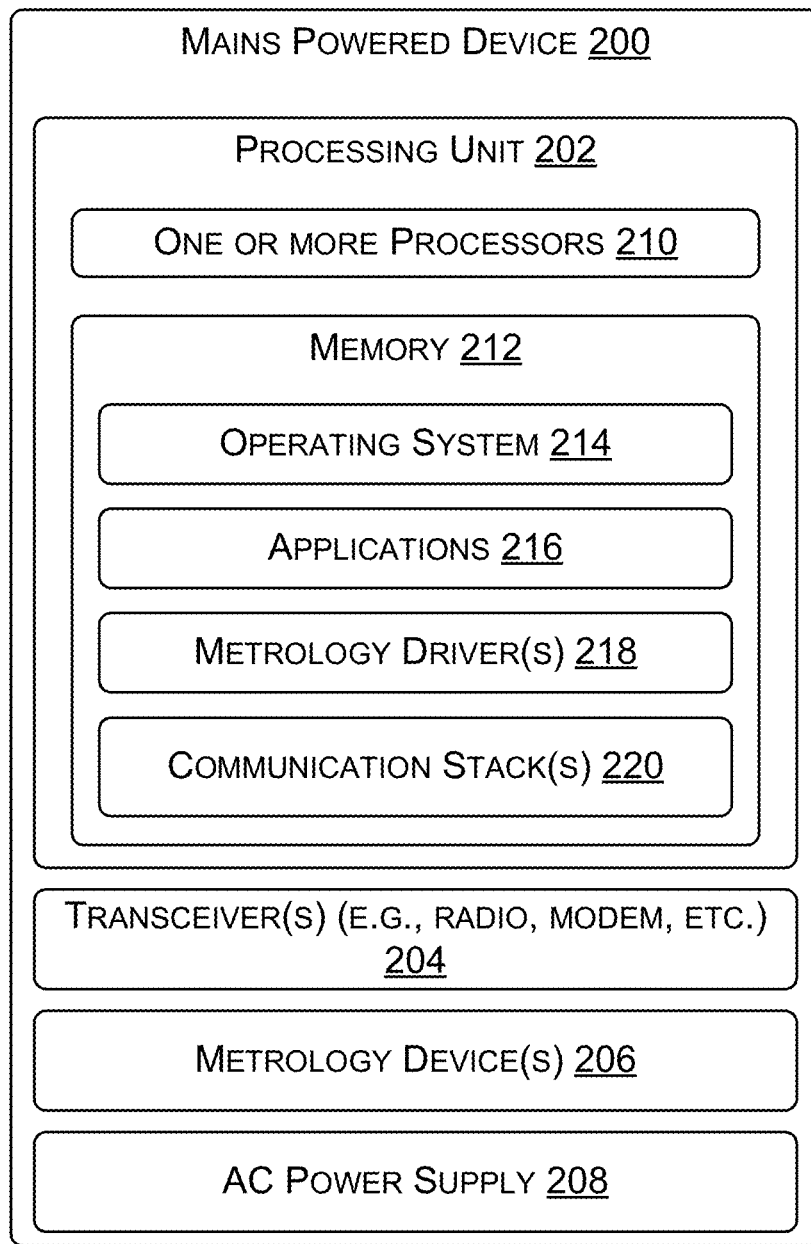
FIG. 2 is a schematic diagram showing example detail of a MPD.

FIG. 2 is a diagram showing details of an example mains powered device, MPD 200. In this example, MPD 200 comprises an electricity meter. However, as discussed above, MPDs can take numerous different forms, depending on the industry and context in which they are deployed. Different types of MPDs may have different physical and/or logical components. For instance, utility meter MPDs such as that shown in FIG. 2 may have metrology components, whereas other types of MPDs may not.

As shown in FIG. 2, the example MPD 200 includes a processing unit 202, a transceiver 204, one or more metrology devices 206, and an alternating current (AC) power supply 208 that couples to the AC mains power line wherein the MPD 200 is installed. The processing unit 202 may include one or more processors 210 and memory 212 and/or other hardware device(s), such as an application specific integrated circuit (ASIC), a gate array or other hardware-based logic device. When present, the processor(s) 210 may comprise microprocessors, central processing units, graphics processing units, or other processors usable to execute program instructions to implement the functionality described herein. In addition or alternatively, in some examples, some or all of the functions described may be performed in hardware.

The transceiver 204 may comprise one or more hardware and/or software implemented radios to provide two-way RF communication with other network communication devices in the area network 107 and/or other computing devices via the network 110. The transceiver 204 may additionally or alternatively include a modem to provide PLC communication with other network communication devices that are connected to an electrical service grid.

The metrology device(s) 206 comprise the physical hardware and sensors to measure consumption data of a resource (e.g., electricity, water, or gas) at a site of the meter. In the case of an electric meter, for example, the metrology device(s) 206 may include one or more Hall effect sensors, shunts, or the like. In the case of water and gas meters, the metrology device(s) 206 may comprise various flow meters, pressure sensors, or the like. The metrology device(s) 206 may report the consumption data to the central office 112 via the transceiver 204. The consumption data may be formatted and/or packetized in a manner or protocol for transmission.

The memory 212 includes an operating system (OS) 214 and one or more applications 216 that are executable by the processor(s) 210. The memory 212 may also include one or more metrology drivers 218 configured to receive, interpret, and/or otherwise process the metrology data collected by the metrology device(s) 206. Additionally or alternatively, one or more of the applications 216 may be configured to receive and/or act on data collected by the metrology device(s) 206.

The memory 212 may also include one or more communication stacks 220. In some examples, the communication stack(s) 220 may be configured to implement a 6LowPAN protocol, an 802.15.4e (TDMA CSM/CA) protocol, and/or an 802.15.4g protocol. However, in other examples, other protocols may be used, depending on the networks with which the device is intended to be compatible. The communication stack(s) 220 describe the functionality and rules governing how the MPD 200 interacts each of the specified types of networks. For instance, the communication stack(s) 220 described in this disclosure cause MPDs and BPDs to operate in ways that minimize the battery consumption of BPDs when they are connected to these types of networks. Additional details of how the communication stack(s) 220 implement these operations are described throughout the disclosure.

The memory 212 may also include a neighbor list and/or a parent list. The neighbor list includes a list of devices that are in a vicinity of the MPD 200. Devices may be added to the neighbor list as they are discovered by the MPD 200. The parent list includes a list of devices that are parents or potential parents of the MPD 200. Potential parents are those devices that are closer to an edge or root of the area network 107 and are capable of acting as a parent of the MPD 200. The neighbor list and the parent list may be separate lists or may be combined in a single list. In some examples, the neighbor list, parent list, or other list maintained by the device may include current topology information of the surrounding network (e.g., parents of parents, siblings, two-hop neighbors, etc.), availability of one or more neighbors, availability of one or more channels, or the like. The memory 212 may also include a listening schedule according to which the MPD 200 listens for passive discovery beacons from other devices, for example, according to instructions stored in the memory 212 executed by the one or more processors 210.

Figure 3:
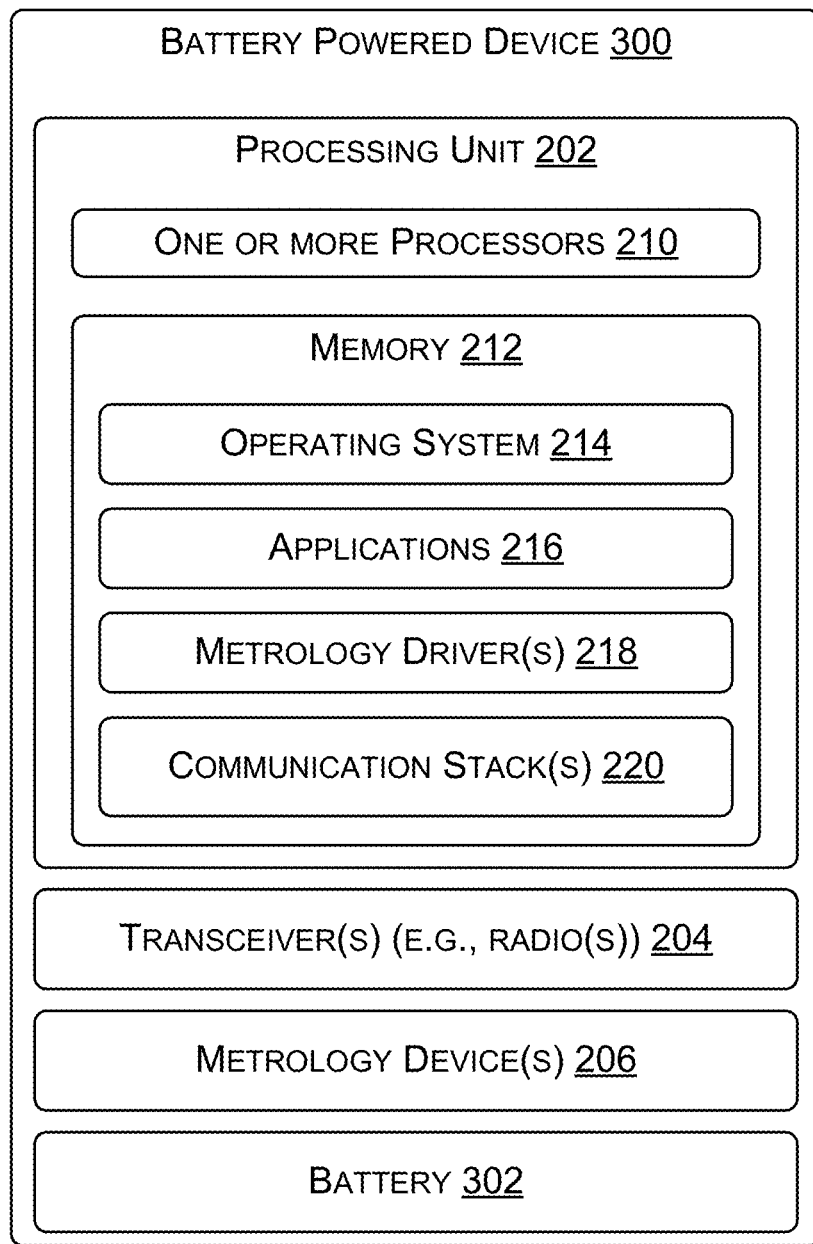
FIG. 3 is a schematic diagram showing example detail of a BPD.

FIG. 3 is a diagram showing details of an example battery powered device, BPD 300. In this example, BPD 300 comprises a water meter or gas meter. However, as discussed above, BPDs can take numerous different forms, depending on the industry and context in which they are deployed. Different types of BPDs may have different physical and/or logical components. For instance, utility meter BPDs such as that shown in FIG. 3 may have metrology components, whereas other types of BPDs may not.

The BPD 300 of FIG. 3 is similar in many respects to the MPD 200. To the extent that the MPD 200 and 200 include the same or similar components, descriptions of them may not be repeated here. Therefore, the following discussion of the BPD 300 focuses on the differences between the BPD 300 and the MPD 200. However, the differences highlighted below should not be considered to be exhaustive. One primary difference between the MPD 200 and the BPD 300 is that the BPD 300 includes a battery 302 instead of the mains power supply 208. The specific characteristics of the battery 302 may vary widely depending on the type of BPD. By way of example and not limitation, the battery 302 of the example water or gas meter of FIG. 3 may comprise a 3 volt Lithium Thionyl Chloride battery having an internal impedance rated at 130 Ohms or a 3 volt Lithium Manganese battery having an internal impedance rated at 15 Ohms.

Also, in some examples, even components with similar functions may be different for MPDS than for BPDs due to the different constraints. As one example, while both MPDS and BPDs have transceivers, the specific transceivers used may be different. For instance, a MPD transceiver may include a PLC modem while a BPD transceiver typically does not because the BPD is not connected to an electrical power line that could be used for PLC communications. Additionally or alternatively, a BPD transceiver may employ a lower power RF radio to minimize energy consumption. As with an MPD, the BPD may also include a listening schedule according to which the BPD 300 listens for passive discovery beacons from other devices, for example, according to instructions stored in the memory 212 executed by the one or more processors 210.

The memory 212 of the MPD 200 and BPD 300 is described to include software functionality configured as one or more "modules." However, the modules are intended to represent example divisions of the software for purposes of discussion, and they are not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.).

While detailed examples of certain computing devices (e.g., MPD 200 and BPD 300) are described above, it should be understood that even those computing devices not described in detail may include one or more processors and memory storing processor executable instructions to implement the functionalities they are described as performing. Certain computing devices may additionally or alternatively include one or more hardware components (e.g., application specific integrated circuits, field programmable gate arrays, systems on a chip, and the like) to implement some or all of the functionalities they are described as performing The various memories described herein are examples of computer-readable media. Computer-readable media may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Example Channel Function

Figure 4:
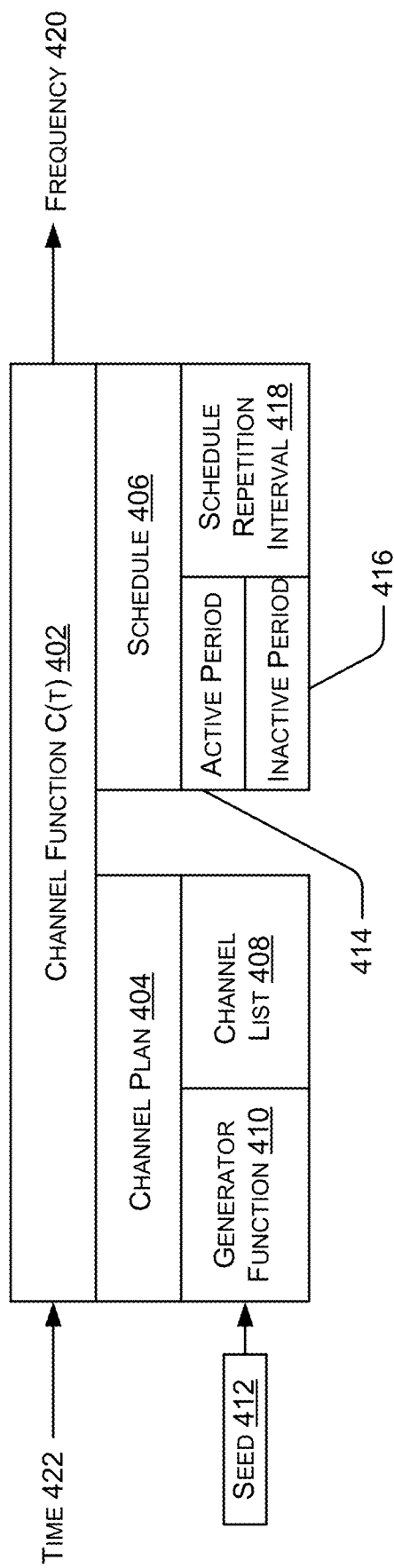
FIG. 4 illustrates an example channel function that may be implemented by a device.

FIG. 4 illustrates an example channel function 402 that may be implemented by a device, such as the MPD 200 and/or the BPD 300. In many instances, the device may communicate in a frequency hopping context (e.g., dynamic, pseudo-random frequency occupancy). To implement frequency hopping, the device may employ the channel function 402 to determine a frequency, at any given time, at which the device is to operate.

As illustrated in FIG. 4, the channel function 402 may rely on multiple elements. In particular, the channel function 402 may depend on frequencies determined by a channel plan 404 and by a schedule 406 determined by time. The channel plan 402 may be generated from available channels in a channel list 408 and a mapping of the available channels to a sequence of elements produced by a generator function 410 (e.g., a Pseudo-Random Generator Function (PRG)). In some instances, the channel list 408 may exclude channels that are identified in a list of excluded channels. Different sequences over the same available channels may be produced depending on a value of a seed 412 that is input into the generator function 410. The schedule 406 may be generated based on an active period 414 and an inactive period 416 for a schedule repetition interval 418. The schedule repetition interval 418 may define a duration of time of a schedule element. The active period 414 may define a duration of time within a schedule element during which a device listens for communications, and the inactive period 416 may define a duration of time within the schedule element during which the device may not listen. While the device is not listening for communications, the radio receiver may be quiescent such that it is consuming no or a relatively small amount of power. On the other hand, when the device is listening for communications, the radio receiver is consuming much more power than when it is quiescent. By limiting the amount of time the device is listening for communications, battery power is conserved. The schedule 406 may define the schedule repetition interval 418 which maps onto an element of the channel plan 404 to produce the relationship between time (t) and frequency (f) such that f=C(t). In some instances, the schedule 406 may indicate information related to an event, such as a reference schedule element boundary element number (associated with an event reference schedule element boundary (SEB)), an event offset, and/or an event repetition interval, as discussed in further detail below. An example channel plan is discussed in further detail in reference to FIG. 5.

The generator function 410 may implement a variety of functions to produce the channel plan 404 from the channel list 408. For example, the generator function 410 may implement a direct hash (e.g., Jenkins Hash), a randomizing algorithm (e.g., that described in ANSI-TIA-4957.200), or any other type of function.

As such, the channel function 402 may be used by a device to determine a frequency (f) 420 for a time (t) 422. That is, the channel function 420 may receive, as an input, the time 422 and provide, as an output, the frequency 420 for the time 422. This may allow the device to frequency hop over various channels.

Example Channel Plan

Figure 5:
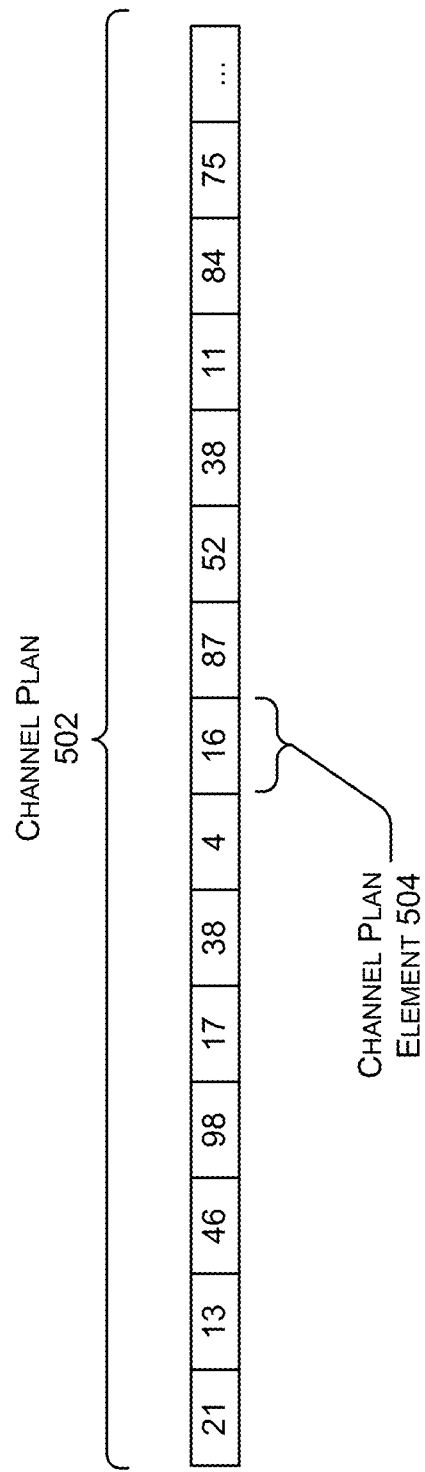
FIG. 5 illustrates an example channel plan utilized by the example channel function.

FIG. 5 illustrates an example channel plan 502. The example channel plan 502 may be used within the context of the channel function 402 of FIG. 4 (e.g., implemented as the channel plan 404).

As illustrated, the channel plan 502 may include a pseudo-random channel number sequence (e.g., 21, 13, 46, . . . ). As noted above, a generator function (e.g., the generator function 410 of FIG. 4) may generate the pseudo-random channel number sequence (the channel plan 502) over a range of channel numbers derived from a channel list (e.g., the channel list 408 of FIG. 4). In some instances, the channel list may exclude channels that are identified in a list of excluded channels. In the example of FIG. 5, each number in the pseudo-random channel number sequence represents a channel (e.g., a frequency band). As illustrated, a channel plan element 504 may correspond to a channel (e.g., channel 16 in this example). Here, there are 128 available channels, although any number of channels may be implemented (e.g., 32 channels, 64 channels, etc.). Thus, the pseudo-random channel number sequence may include numbers from 1 to 128. More generally, the number of available channels is N and, in one other example, N is equal to 512.

In some instances, multiple frequency bands are defined for operation in different regions and/or regulatory domains. A total number of channels, and hence the available channel number range, may depend on a selected regional band and channel spacing, which may be determined by a physical layer (PHY) configuration. A channel list may advertise a regional frequency band, channel center frequencies and spacing, and optionally a set of channels to be excluded.

Example of Joining a Battery Powered Device to a Network

Before a gas or water meter or other battery powered device (BPD) can exchange data (e.g., resource consumption data, sensor data, etc.) over an area network, such as area network 107, the BPD must typically join the network. This section describes example processes that BPDs may use to join an area network. The example processes described help to minimize consumption of battery power by the BPD when joining such a network.

Figure 6:
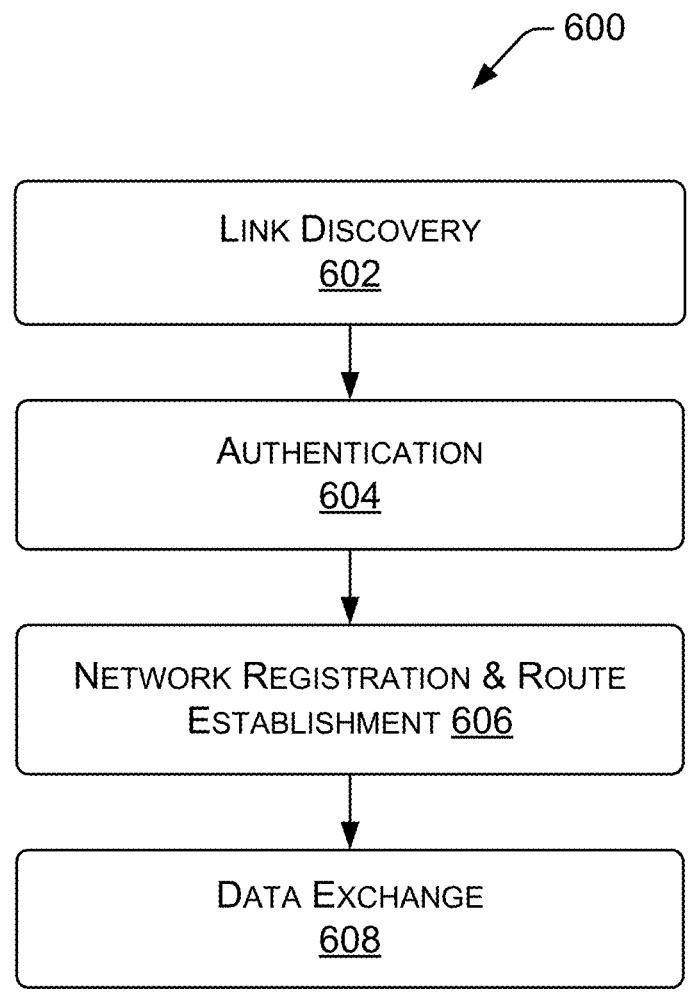
FIG. 6 illustrates an example method for a device to join a network.

FIG. 6 is a flowchart illustrating a process 600 usable by a BPD to join an area network. The process generally includes four main phases, link discovery 602, authentication and authorization 604, network registration and route establishment 606, and data exchange 608. Link discovery 602 is the process of discovering other network computing devices that are within communication range of the BPD. Authentication and authorization 604 is the process of identifying the BPD to the network and obtaining any necessary network credentials. Network registration and route establishment 606 is the process of informing the network of the BPDs existence and place in the network. Upon successful completion of the preceding phases, a BPD will be able to exchange data, such as metering data, sensor data, or the like with a collection engine or other central office services during the data exchange phase 608.

The BPD may listen for messages from "joined" devices (e.g., devices that have previously joined or are otherwise already members of the area network) during a listening window of the BPD. The joined devices are typically MPDs, but may be other BPDs. As discussed later, the BPD may have some expectation as to approximately when a joined device will be transmitting discovery messages to the BPD based, for example, on having been previously made aware of the discovery message transmission schedules of the joined devices.

Figure 7:
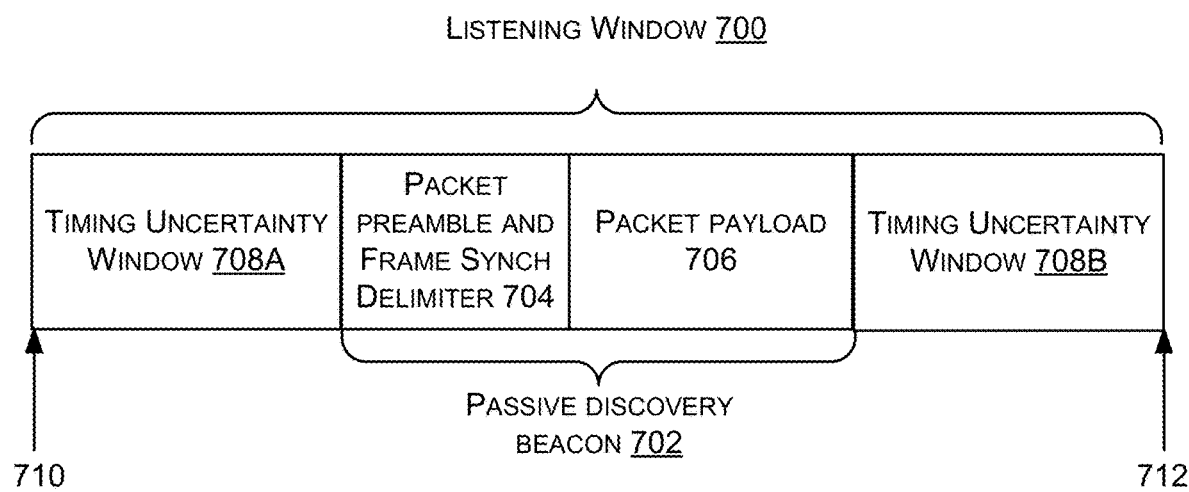
FIG. 7 schematically illustrates an example listening window for a BPD to listen for passive discovery beacons.

FIG. 7 illustrates an example listening window 700 in which a BPD may listen for passive discovery beacon (PDB) messages that are transmitted by joined devices. The PDB may include one or more information elements indicating that the second device may be used as a parent to the first device such as time and frequency at which the joined device transmits and receives, and even possibly a metric the second device may use to determine which joined device(s) is best for it to communicate with and/or through. The PDB may also include an information element to specifically establish a sampled schedule for the first device moving forward. If the second device is accepted as a parent, the first device may enter a low power state and/or awake state according to the sampled schedule.

This listening methodology for a BPD to discover joined devices may conserve battery life over methodologies in which the BPD is more active. For example, by utilizing a listening window where the BPD may listen for passive discovery beacons from joined devices, power costly transmissions by the BPD may be minimized. Generally, actively receiving uses less power than transmitting. Furthermore, passively listening generally uses less power than actively receiving.

The listening window 700 is associated with a BPD listening for a passive discovery beacon 702 from a joined device. The passive discovery beacon 702 typically comprises a packet preamble and frame synchronization delimiter (PA/SFD) 704 and a packet payload 706. Due to an uncertainty by the BPD in when the joined device will transmit the passive discovery beacon, the listening period 700 also includes a timing uncertainty window before (708A) and/or after (708B) the passive discovery beacon 702. The timing uncertainty windows 708A and 708B may also account for a jitter in the transmission of the passive discovery beacon 702. Jitter may include, for example, an uncertainty in a transmitter on time due to characteristics of a transmitter possibly as well an uncertainty in the clock used by the transmitter to time its transmissions.

Figure 8:
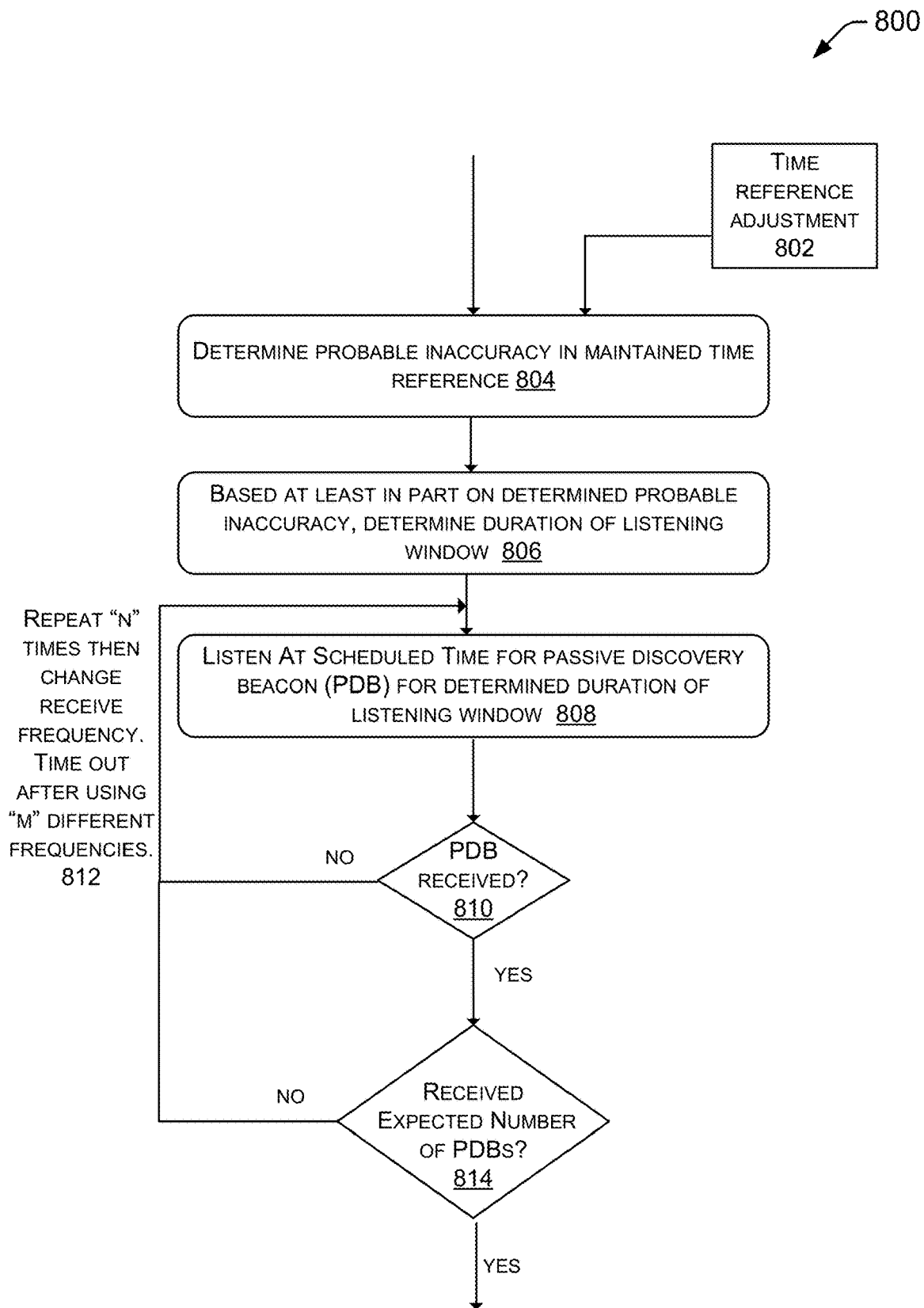
FIG. 8 is a flowchart illustrating an example process for a BPD to listen for passive discovery beacons.

FIG. 8 is a flowchart illustrating an example process by which a BPD listens for a passive discovery beacon 702. At 804, the BPD determines a probable inaccuracy in a time reference maintained by the BPD. At some points, a time reference adjustment 802 is received by the BPD and usable in determining the time reference probable inaccuracy. For example, the time reference adjustment may have been determined based on time reference information provided from joined devices in previously-received passive discovery beacons (or other transmissions), and a duration since the last time reference information was received by the PDB may be used along with the previously-received time reference adjustment 802, to determine the time reference probable uncertainty. At 806, based at least in part on the time reference probable inaccuracy determined at 804 (and, in some examples, a possible jitter in the transmission of the passive discovery beacon), the BPD determines the duration of the listening window, including the time uncertainty window 708A and 708*b*. At 808, based on the time reference maintained by the BPD and when the BPD expects a joined device may transmit, the BPD listens at a scheduled time for a passive discovery beacon (PDB) for the duration of the listening window as determined at 806. At 810, if the PDB was not received during the listening window, processing may repeat 812 with listening during another listening window. Otherwise, if the PDB was received during the listening window, processing continues to 814, where it is determined if the expected number of PDBs has been received from different parents. The expected number could be one or more. If the expected number of PDBs has not been received, processing may repeat 812 with listening during another listening window. Otherwise, if the expected number of PDBs has been received, processing ends.

Figure 9:
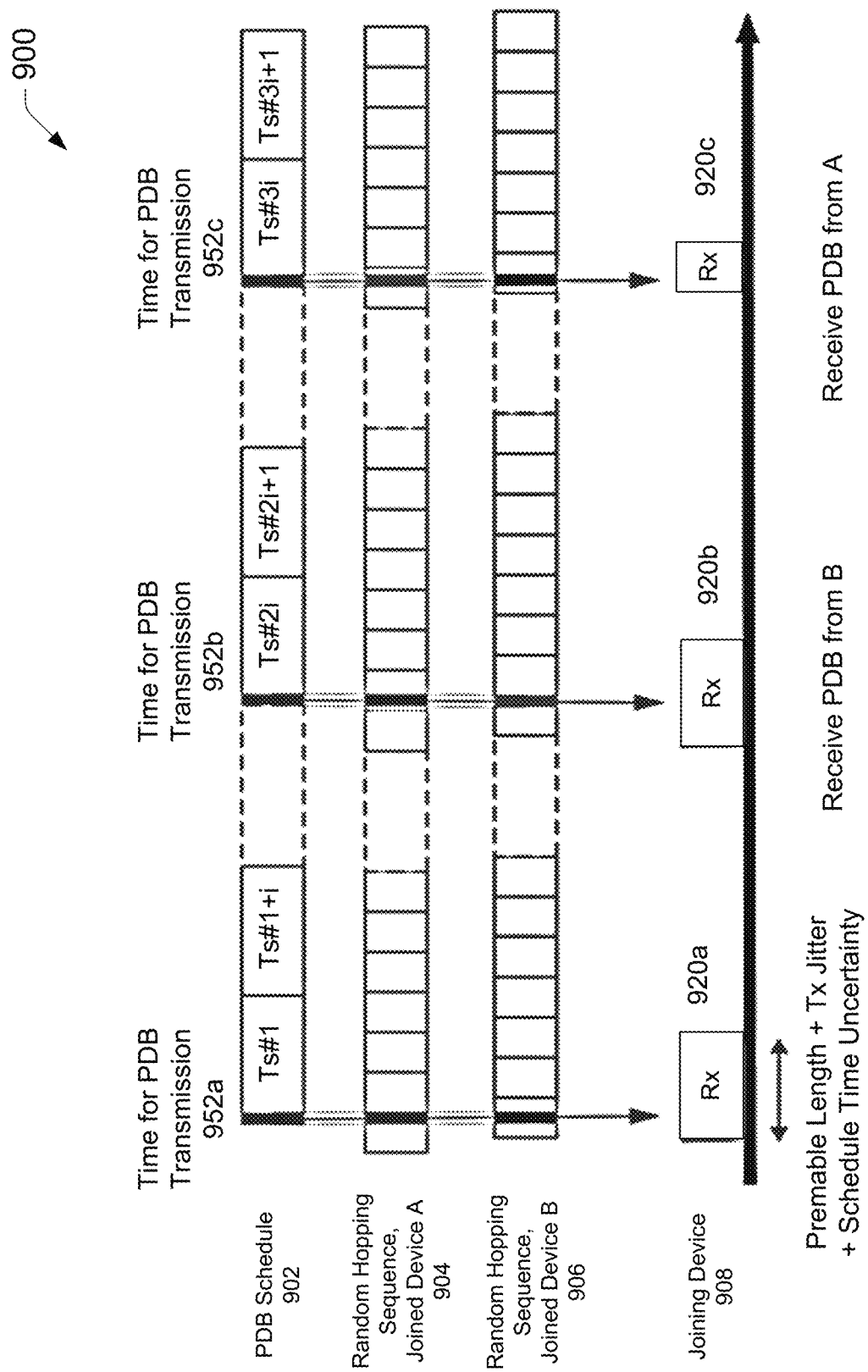
FIG. 9 is a diagram illustrating example timing of how the various network devices may interoperate in accordance with the process illustrated in FIG. 8.

FIG. 9 is a diagram 900 illustrating example timing of how the various network devices may interoperate in accordance with the process illustrated in FIG. 8. In the FIG. 9 diagram, row 902 indicates a system-wide schedule for PDB transmission by joined devices, in the aggregate. Row 904 indicates the transmission channel hopping sequence of a Joined Device A, and Row 906 indicates the transmission channel hopping sequence of a Joined Device B. The transmission hopping sequence of Joined Device A may be random, and may be different from a random transmission hopping sequence of Joined Device B. Finally, Row 908 indicates listening windows of a BPD Joining Device.

Turning now to FIG. 9 in detail, the PDB schedule 902 comprises a plurality of time slots: TS # i, TS # i+1, ... , TS #2i, TS #2i_1, ... , etc. Furthermore, Joined Device A and Joined Device B each transmit a PDB on a known schedule. In FIG. 9, this transmission occurs at the beginning of each TS # ni time slot in the PDB schedule 902, where "n" is an integer. The PDB transmission schedule in 902 may be chosen such that it 'walks in time' with the transmission channel hopping sequence of 904 and 906. This can be achieved by having a PDB schedule (PDB TS length*ni) that is a non-multiple of the hopping sequence element length, such that a periodicity of the PDB transmission schedule in 902 is different from a periodicity of the transmission channel hopping sequence of 904 and 906.

This PDB transmission by Joined Device A and Joined Device B is shown in Rows 904 and 906, respectively. It should be noted that the PDB transmission by each of Joined Device A and Joined Device B may be on different respective random channels which may, for example, create frequency multiplexing of PDB transmission. In some examples, each Joined Device transmits on the same frequency for more than one PDB transmission, before moving to a different random channel for subsequent PDB transmissions.

As indicated by the example listening windows 920*a*, 920*b*, and 920*c*, a Joining Device 908, by its knowledge of the systemwide PDB transmission schedule, listens for the PDB during a listening window such as determined at 806 of the FIG. 8 processing.

For example, during the listening window 920*a*, even though this at least partially coincides with a PDB transmission time 952a according to the PDB schedule 902, a PDB has not been received by the Joining Device 908. This may be due to the receive frequency of the Joining Device 908 not matching a PDB transmission frequency of a joined device, it may be due to conditions of the radio frequency environment, or it may be due to other reasons such as a temporary physical obstruction blocking transmissions from reaching the joining device.

During the listening window 920b, however, the Joining Device 908 receives a PDB from Joined Device B. In addition to information usable by the joining device to communicate with a joined device such as Joined Device B, the PDB may also provide an updated time reference to the joining device, decreasing the time reference probable uncertainty for future listening windows. Thus, the listening window 920c can be shortened relative to the listening window 920b. During listening window 920c, the joining device receives a PDB from Joined Device A.

In accordance with another aspect, timing between listening periods of a BPD may be adjusted based on conditions in the network, such as whether a BPD has received a PDB.

Figure 10:
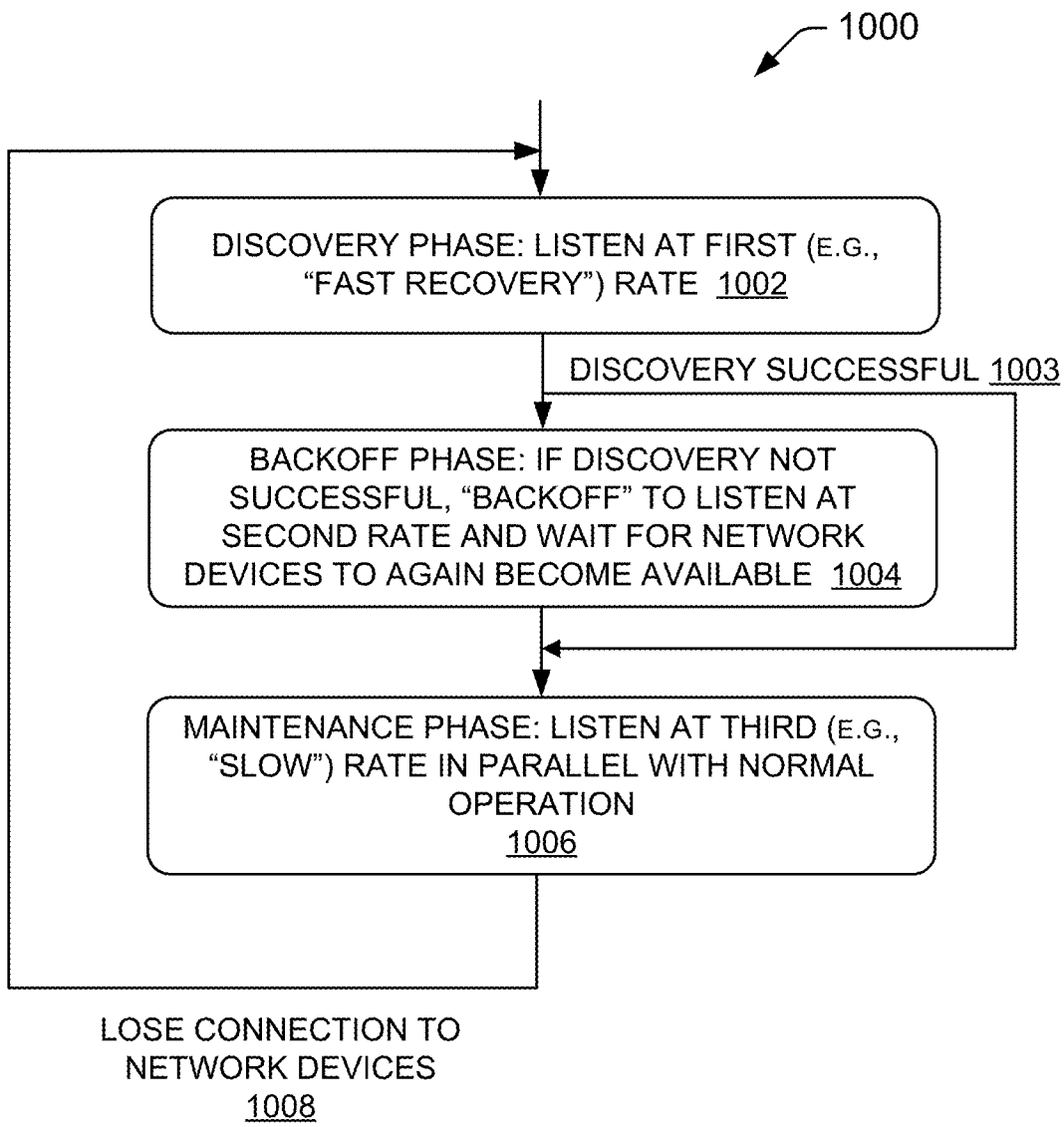
FIG. 10 is a flowchart illustrating an example process for a BPD to discover and maintain connections with network devices.

FIG. 10 is a flowchart that illustrates a process 1000 for the timing of subsequent listening periods to be set. At 1002, during a discovery phase at which no joined devices have been currently discovered by the BPD, listening periods are repeated at a first rate, which is relatively high. In this way, links to joined devices can be rapidly acquired. At 1003, if discovery has been successful at 1002, then the BPD enters into a maintenance phase at 1006. At 1004, if discovery has not been successful at 1002, then the BPD enters a backoff phase in which listening periods are repeated at a second rate (or range of rates), which is/are lower than the first rate. This could mean, for example, using simply a lower fixed rate or decreasing the rate according to some function such as a linearly decreasing function or an exponentially decreasing function. That is, given that discovery was not successful at 1002, it is assumed that no joined devices are currently available. If no joined devices are currently available, it would be inefficient for the BPD to continue to rapidly listen for passive discovery beacons that will never be transmitted. At some point, though, when joined devices become available, the passive discovery beacons transmitted by the joined devices will be received by the BPD, even when listening at the much lower rate, and transition can be made to the maintenance phase from the backoff phase. At 1006, in the maintenance phase, the listening periods are repeated at a third, very slow rate, which is lower than the first rate, in parallel with normal data transfer operation of the BPD, so that the BPD may receive connection updates even while connected to and interoperating with joined devices. If the BPD loses connection 1008 with a joined device, the BPD can go back to the discovery phase of 1002. In some examples, the third rate may be lower than the second rate or range of rates as well.

Figure 11:
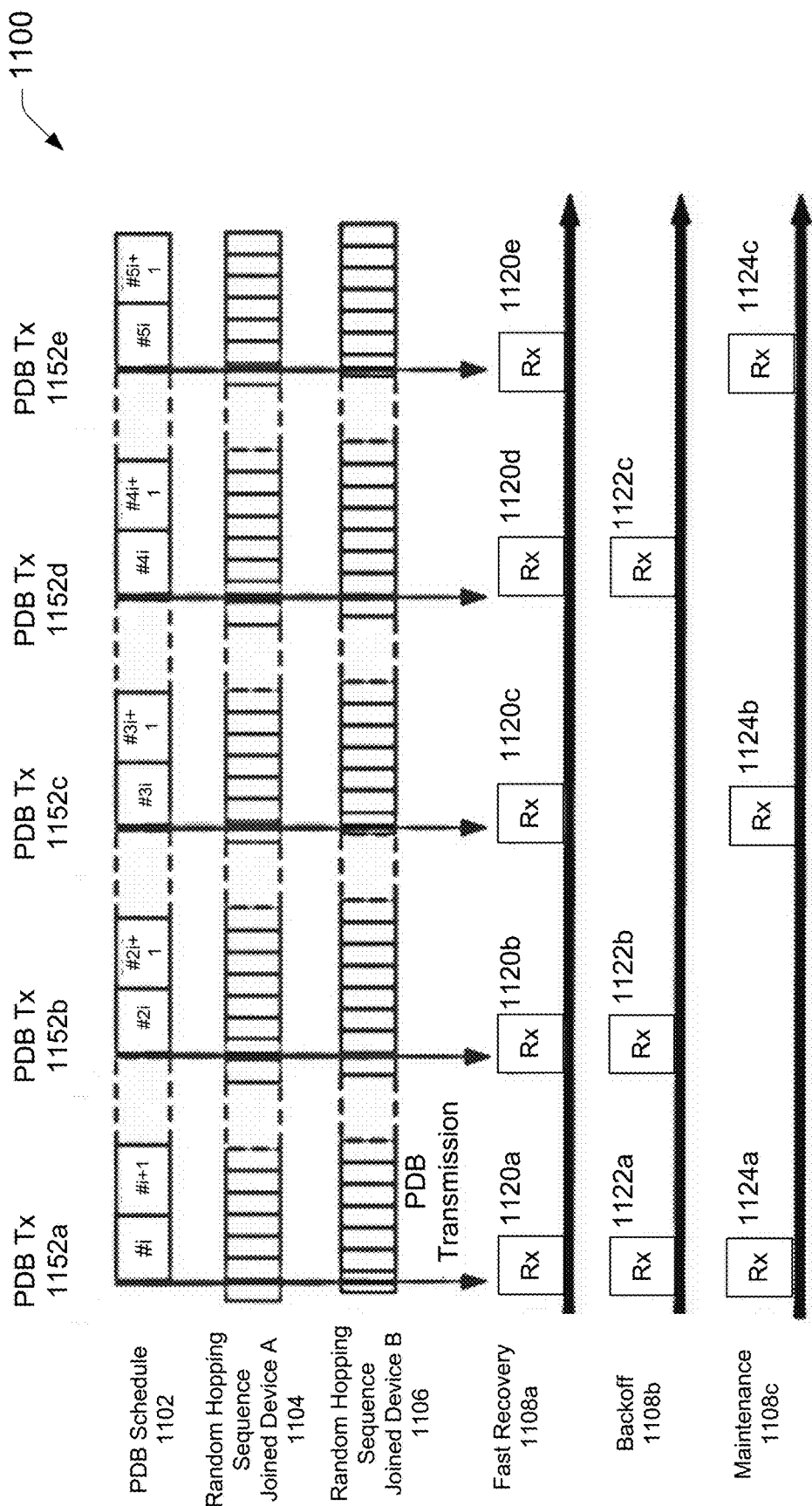
FIG. 11 is diagram illustrating example timing of how the various network devices may interoperate in accordance with the process illustrated in FIG. 10.

FIG. 11 is a diagram illustrating the timing of how the various network devices may interoperate in accordance with the process illustrated in FIG. 10. In the FIG. 11 diagram, row 1102 indicates a system-wide schedule for PDB transmission by joined devices, in the aggregate. Row 1104 indicates the transmission channel hopping sequence of a Joined Device A, and Row 1106 indicates the transmission channel hopping sequence of a Joined Device B. Finally, Rows 1108a, 1108b and 1108c indicate listening windows of a BPD Joining Device in the various BPD listening phases of fast recovery 1108a, backoff 1108b and maintenance 1108c, such as just described with reference to FIG. 10.

Turning now to FIG. 11 in detail, the PDB schedule 1102 comprises a plurality of time slots: TS # i, TS # i+1, . . . , TS #2i, TS #2i_1, . . . , etc. Furthermore, Joined Device A and Joined Device B each transmit a PDB on a known schedule. In FIG. 11, this transmission occurs at the beginning of each TS # ni time slot in the PDB schedule 1102, where "n" is an integer. This PDB transmission by Joined Device A and Joined Device B is shown in Rows 1104 and 1106, respectively. The PDB transmission by each of Joined Device A and Joined Device B may be on a respective random channel which may, for example, create frequency multiplexing of PDB transmission. In some examples, each Joined Device transmits on the same frequency for more than one PDB transmission, before moving to a different random channel for subsequent PDB transmissions.

As shown in FIG. 11, during a fast recovery phase 1108a of operation, a Joining Device, by its knowledge of the systemwide PDB transmission schedule 1102, listens for the PDB during various listening windows 1102a, 1102b, etc. If the Joining Device does not hear a PDB before a particular condition is met (such as a particular number of listening attempts being made), then the Joining Device may move into a backoff phase 1108b of operation. In one example, assuming only one Joined Device in the neighborhood of the Joining Device, all of the channels are scanned three times, which provides a high probability the PDB will be heard by the Joining Device when the transmitting and listening channel matches. In other words, in one example, the time before entering the backoff phase 1108b may be:

(3 sweeps)*(N channels)*(PDB Tx period corresponding to TS # ni).

With 128 channels and a Tx period of five minutes, this would be 32 hours, or about 1.3 days. The number of sweeps is configurable, and it is not limited to being three.

During the backoff phase 1108b, the listening windows during which the Joining Device listens for a PDB occur less frequently than in the fast recovery phase 110a. Upon occurrence of another particular condition (such as receipt of a PDB), then the Joining Device moves into a maintenance phase 1108c of operation, during which the Joining Device listens only infrequently for a PDB, typically for the purpose of receiving connection updates even while connected to and interoperating with Joining Device. The frequency of occurrence of the listening windows in any of the fast recovery phase, the backoff phase and the maintenance phase may be based on a level of charge of the battery. Thus, for example, the lower the level of charge, the frequency of occurrence of the listening windows may be lowered.

Figure 12:
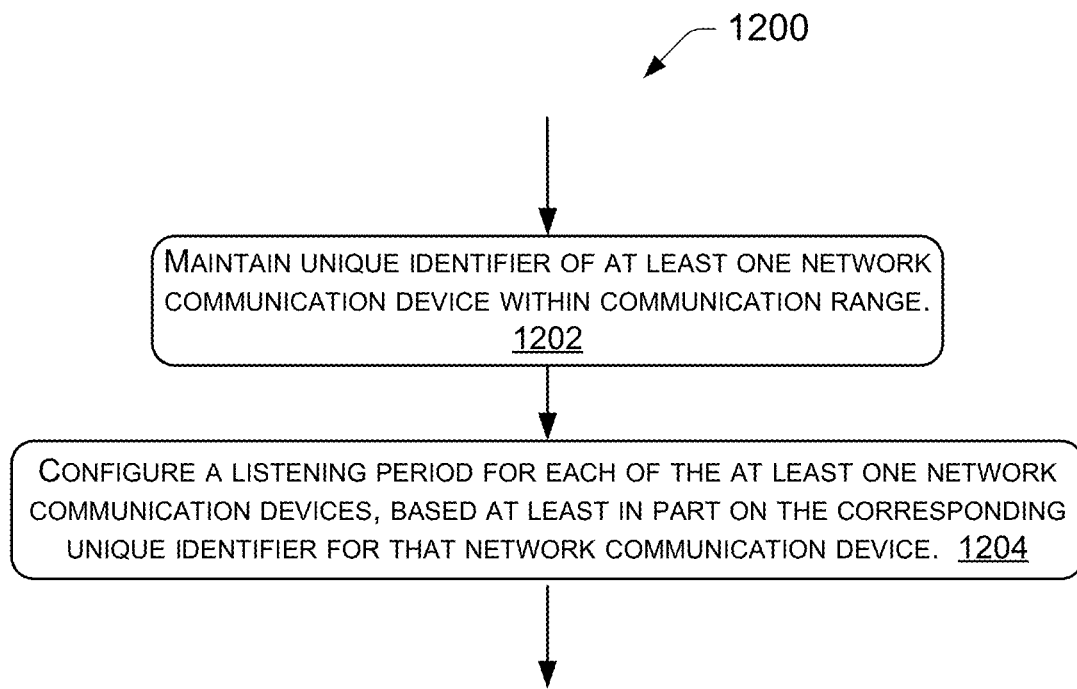
FIG. 12 is a flowchart illustrating an example process for a BPD to configure unique listening schedules for different network devices.

In accordance with yet another aspect, when a BPD already has information about a joined device, such as by the PBD having previously connected to that joined device or having been configured with that information (such as at installation time), the BPD can use that information to configure its listening periods for more efficient receipt of a PDB from that joined device. FIG. 12 is a flowchart illustrating a process 1200 for a BPD to configure unique listening schedules to listen for PDBs from different network devices. At 1202, the BPD maintains a unique identifier of at least one network communication device within communication range. For example, the unique identifier may be a MAC address or an indication of some other unique characteristic. At 1204, the BPD configures a listening period based on the unique identifier of the network communication device. For example, the MAC address of the network communication device may be used by the network communication device to configure its transmission frequency hopping sequence, at least for transmitting PDBs. The BPD, by knowing the MAC address of the network communication device and an algorithm used by the network communication device to configure its transmission hopping frequency sequence, can configure its listening periods to receive on a channel which it knows the network communication device to be using for transmission. The algorithm may be, for example, a pseudorandom number generator (e.g., using a hash function) that uses as input the MAC address and the listening schedule element number for the transmitting network communication device.

Figure 13:
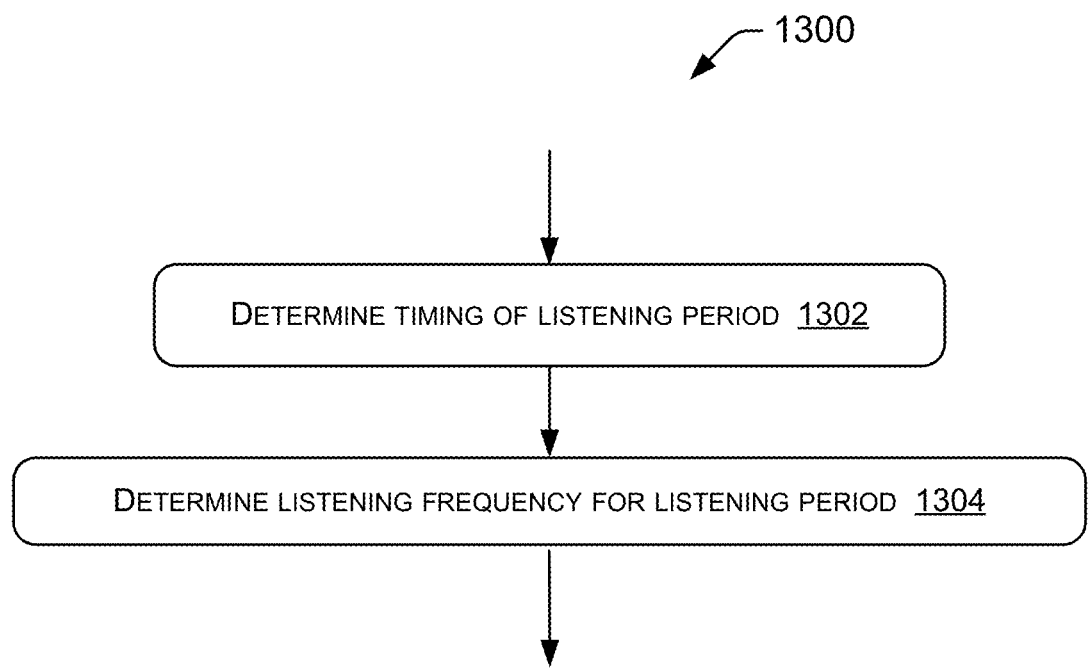
FIG. 13 is a flowchart providing additional details of the example process illustrated in the flowchart of FIG. 12.

FIG. 13 is a flowchart providing additional details of the process illustrated in the FIG. 12 flowchart. At 1302, the BPD determines the timing (and perhaps length) of the listening periods, such as by using one or more of the methods already described. At 1304, the BPD determines the listening frequency for each listening period. As just mentioned, this may be done, for example, by applying an algorithm to the MAC address or other unique identifier associated with the joined device to which the BPD is listening.

Figure 14:
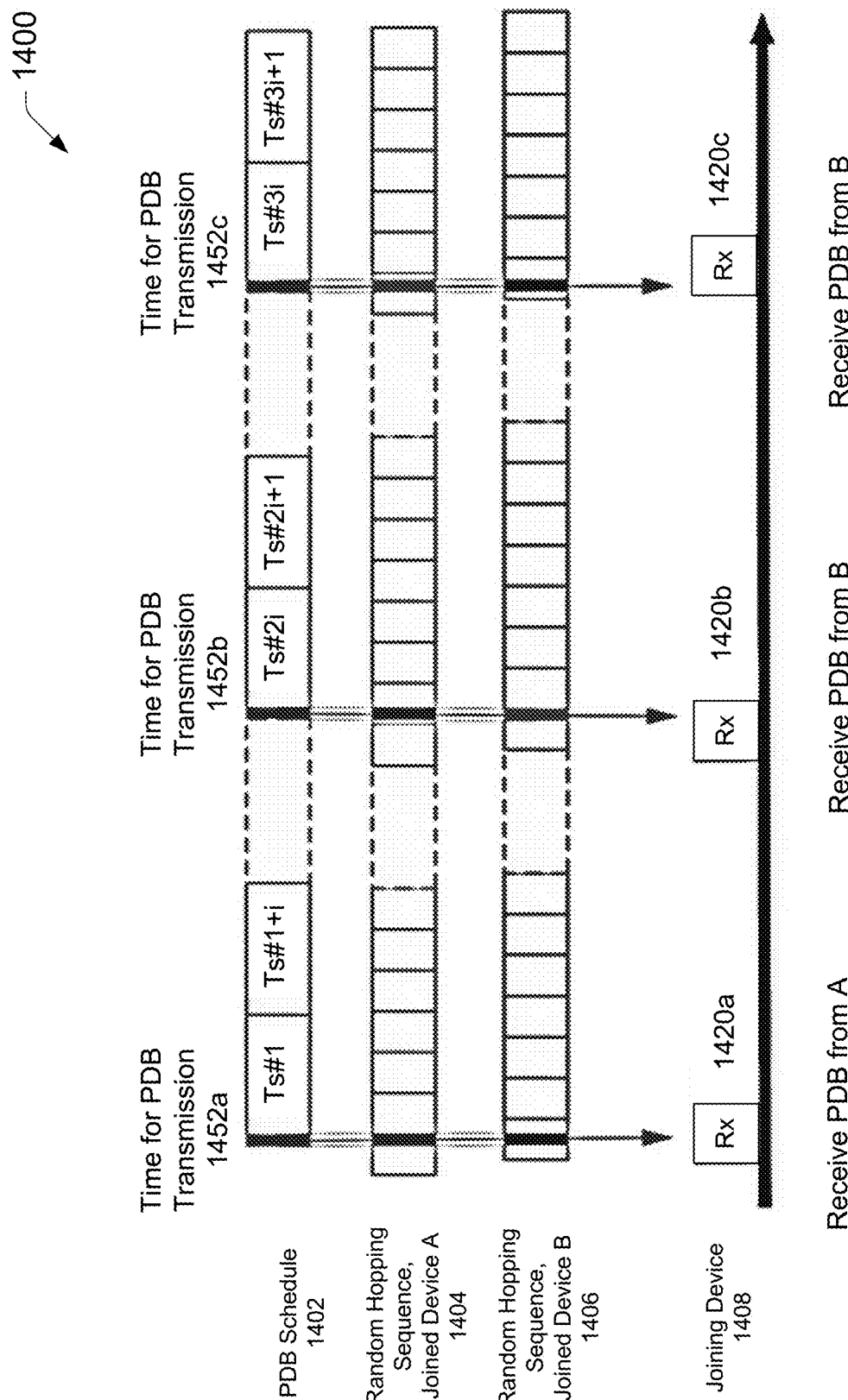
FIG. 14 is diagram illustrating example timing of how the various network devices may interoperate in accordance with the process illustrated in FIG. 12 and FIG. 13.

FIG. 14 is diagram illustrating the timing of how the various network devices may interoperate in accordance with the process illustrated in FIG. 12 and FIG. 13. Turning now to FIG. 14 in detail, the PDB schedule 1402 comprises a plurality of time slots: TS # i, TS # i+1, . . . , TS #2i, TS #2i_1, . . . , etc. Furthermore, Joined Device A and Joined Device B each transmit a PDB on a known schedule. In FIG. 14, this transmission occurs at the beginning of each TS # ni time slot in the PDB schedule 1402, where "n" is an integer. This PDB transmission by Joined Device A and Joined Device B is shown in Rows 1404 and 1406, respectively. As discussed previously, the PDB transmission by each of Joined Device A and Joined Device B may be on a respective random channel which may, for example, create frequency multiplexing of PDB transmission. However, while the channel transmission may have random properties, the transmissions in the aggregate may in fact be pseudorandom or otherwise have a determinative sequence.

As indicated by the example listening windows 1420a, 1420b and 1420c, a Joining Device 1408, by its knowledge of the systemwide PDB transmission schedule, listens for the PDB. Furthermore, because the Joining Device 1408 has knowledge of the transmission channel hopping sequences 1404, 1406 of the Joined Device A and Joined Device B, respectively, the Joining Device 1408 can listen during the listening periods 1420a, 1420b, 1420c, etc. on the channels it knows joined devices to be using for transmitting the PDBs.

Thus, referring still to FIG. 14, the Joining Device 1408 listens at listening window 1420a on the channel it knows Joined Device A to be using for transmitting a PDB. The joining device further listens at windows 1420b and 1420c on the channel(s) it knows Joined Device B to be using for transmitting a PDB.

Furthermore, in some examples, a joined device may randomly skip PDB transmission opportunities in that joined device's PDB transmission schedule. For example, particularly in instances where the number of transmission channels used by devices of the system is limited, randomized PDB transmission schedules may still be such that some PDB transmissions, from different joined devices, overlap in both frequency and time. In such instances, even when a joining device is listening on a channel at which a joined device is scheduled to and does transmit a PDB, the PDB may not be heard due to an overlapping PDB transmission on the same channel at the same time by different joined device. In fact, due to interference, it is possible that neither of the overlapping PDB transmissions would be heard. Thus, in some examples, each joined device is configured to randomly skip one or more transmission opportunities in its PDB transmission schedule. This can decrease the probability of overlapping PDB transmissions and resulting interference, and thus increase the probability that transmitted PDBs are actually heard by the joining devices that are listening for them.

The random skipping of PDB transmission opportunities by a particular joined device may be based on a unique identifier of the joined device, such as a MAC address of the joined device. This could be accomplished, for example, by using at least the MAC address and the PDB schedule element as input to an algorithm such as a hash function or pseudorandom number generator, and then the MPD having that MAC address skipping at least one PDB transmission opportunity for the PDB schedule element based on the result of applying the algorithm. Because a unique identifier of the joined device is used to determine which PDB transmission opportunities to skip, it is unlikely that different joined devices (which have different unique identifiers) will all skip the overlapping transmission opportunities.

For example, referring to the FIG. 14 diagram, if the number of channels available for use by the Joined Device A and the Joined Device B is relatively small (e.g., 64 channels), and even if there is a relatively large number of available channels, their randomized PDB transmission schedules may still be such that some PDB transmissions overlap in both frequency and time. Thus, for example, the Joined Device B may be configured to randomly skip some PDB transmission opportunities. In the FIG. 14 diagram, an example may be that the Joined Device B, configured to randomly skip some PDB transmission opportunities, skips the PDB transmission opportunity during listening window 1420a. Thus, for example, the Joining Device may be listening during listening window 1420a on the channel Joined Device A is transmitting a PDB. If Joined Device B would otherwise have also transmitted a PDB during the listening window 1420a on the same channel as Joined Device A transmitted a PDB during listening window 1420a, then the joining device may now receive the PDB from Joined Device A during listening window 1420a. That is, if not for the randomized skipping of PDB transmission opportunities by Joined Device B causing Joined Device B to not transmit a PDB during listening window 1420a, then the Joining Device may not have been able to receive the PDB from Joined Device A during listening window 1420a. Particularly for dense networks having a lot of joined devices and relatively few channels available for transmission, the random skipping of PDB transmission opportunities can improve the chances of joining devices hearing transmitted PDBs.

Figure 15:
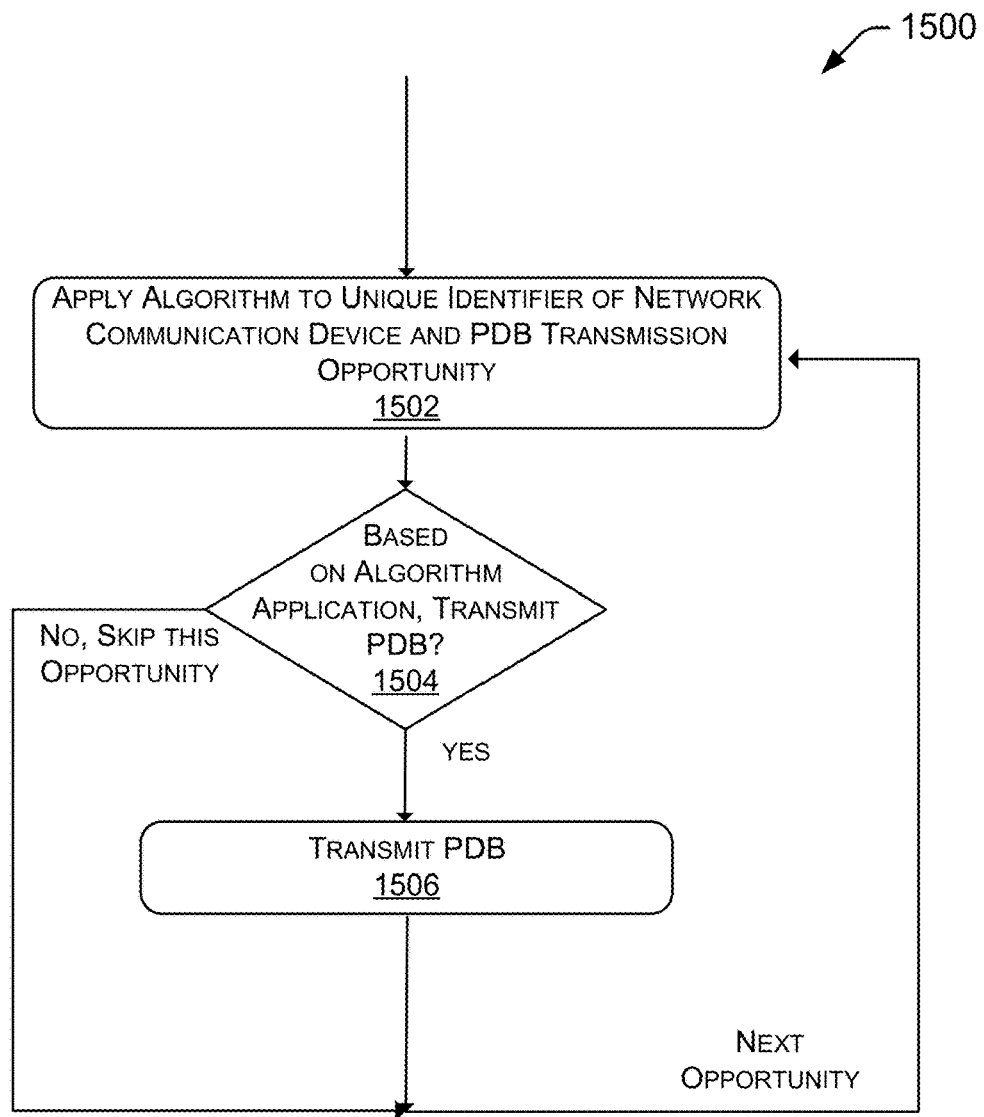
FIG. 15 is a flowchart illustrating an example process for a MPD to skip transmission opportunities in the PDB transmission schedule of the MPD.

FIG. 15 is a flowchart illustrating an example process 1500 for a joined device to skip transmission opportunities in the PDB transmission schedule of the joined device. At 1502, the joined device applies an algorithm to a unique identifier of the joined device and to an identifier of the PDB transmission opportunity. At 1504, it is determined whether the joined device should transmit a PDB during this PDB transmission opportunity. If yes, the joined device transmits the PDB at 1506. If no, then the PDB transmission opportunity is skipped. In either case, at 1502, the joined device applies the algorithm again for the next PDB transmission opportunity. In some examples, the algorithm at 1502 may be run in batch for all PDB transmission opportunities, and the result for each PDB transmission opportunity consulted when the PDB transmission opportunity occurs, for the joined device to determine whether or not to transmit a PDB during that PDB transmission opportunity.

CONCLUSION

We have thus described devices and methods by which devices may join a network using passive discovery beacons transmitted by joined devices. The described techniques are particularly well-suited for battery powered communication devices. By controlling listening windows using the various techniques described herein, joining a network (and maintaining a network connection) can be more efficient, including the joining devices making more efficient use of the battery power available to them.

Although the disclosure describes embodiments having specific structural features and/or methodological acts, it is to be understood that the claims are not necessarily limited to the specific features or acts described. Rather, the specific features and acts are merely illustrative some embodiments that fall within the scope of the claims of the disclosure.

What is claimed is:

1. A communication system, comprising:
a plurality of network communication devices, each respective network communication device comprising:
one or more processors; and
memory coupled to the one or more processors, the memory storing instructions executable by the one or more processors to perform operations including:
transmitting passive discovery beacons (PDBs) responsive to a system-wide time reference and on a PDB transmission schedule for the respective communication device that is synchronized to PDB transmission schedules of others of the network communication devices, each PDB transmitted by the respective network communication device on a frequency determined according to a transmission frequency hopping sequence for the respective network communication device.

2. The communication system of claim 1, wherein:
the transmission frequency hopping sequence for each respective network communication device is based at least in part on a unique identifier for the respective network communication device.

3. The communication system of claim 2, wherein:
the unique identifier for the respective network communication device is a Media Access Control (MAC) address for the respective network communication device.

4. The communication system of claim 1, wherein the operations further include:
determining the transmission frequency hopping sequence for the respective network communication device, including applying an algorithm to at least a unique identifier for the respective network communication device.

5. The communication system of claim 4, wherein the algorithm is a pseudorandom number generator algorithm.

6. The communication system of claim 1, wherein:
for each respective network communication device, the PDB transmission schedule for the respective network communication device has a periodicity that is different from the PDB transmission schedule for at least one other of the network communication devices.

7. The communication system of claim 1, wherein:
the PDB transmission schedule for the respective network communication device includes a plurality of PDB transmission opportunities; and
transmitting by the respective network communication device includes determining particular PDB transmission opportunities to not transmit a PDB.

8. The communication system of claim 7, wherein:
by a respective network communication device, determining particular PDB transmission opportunities to not transmit a PDB includes applying an algorithm to a unique identifier of the respective network communication device.

9. The communication system of claim 8, wherein:
the unique identifier of the respective network communication device is a Media Access Controller (MAC) address for the respective network communication device.

10. The communication system of claim 8, wherein the algorithm is at least one of a hash function or a pseudorandom number generator.

11. A method of operating a plurality of network communication devices of a communication system, comprising:
each respective network communication device, maintaining an indication of a system-wide time reference; and
each respective network communication device, transmitting passive discovery beacons (PDBs) responsive to the system-wide time reference and on a PDB transmission schedule for the respective communication device that is synchronized to PDB transmission schedules of others of the network communication devices, each PDB transmitted by the respective network communication device on a frequency determined according to a transmission frequency hopping sequence for the respective network communication device.

12. The method of claim 11, wherein:
the transmission frequency hopping sequence for each network communication device is based at least in part on a unique identifier for the respective network communication device.

13. The method of claim 12, wherein:
the unique identifier for the respective network communication device is a Media Access Control (MAC) address for the respective network communication device.

14. The method of claim 11, further comprising:
determining the transmission frequency hopping sequence for the respective network communication device, including applying an algorithm to at least a unique identifier for the respective network communication device.

15. The method of claim 14, wherein the algorithm is a pseudorandom number generator algorithm.

16. The method of claim 11, wherein:
for each respective network communication device, the PDB transmission schedule for the respective network communication device has a periodicity that is different from the PDB transmission schedule for at least one other of the network communication devices.

17. The method of claim 11, wherein:
the PDB transmission schedule for the respective network communication device includes a plurality of PDB transmission opportunities; and
transmitting by the respective network communication device includes determining particular PDB transmission opportunities to not transmit a PDB.

18. The method of claim 17, wherein:
by a respective network communication device, determining particular PDB transmission opportunities to not transmit a PDB includes applying an algorithm to a unique identifier of the respective network communication device.

19. The method of claim 18, wherein:
the unique identifier of the respective network communication device is a Media Access Controller (MAC) address for the respective network communication device.

20. The method of claim 18, wherein the algorithm is at least one of a hash function or a pseudorandom number generator.

* * * * *